United States Patent [19]

Santoro

[11] 4,337,910
[45] Jul. 6, 1982

[54] TAPE TENSIONING DEVICE FOR TAPE RECORDERS OF THE CASSETTE TYPE

[76] Inventor: Giovanni Santoro, Via Campo di Mele 55, Roma, Italy

[21] Appl. No.: 184,215

[22] Filed: Sep. 5, 1980

[30] Foreign Application Priority Data

Sep. 5, 1979 [IT] Italy ............................... 50183 A/79

[51] Int. Cl.³ ......................... G03B 1/04; G11B 15/32
[52] U.S. Cl. ................................................... 242/204
[58] Field of Search ............................... 242/200–204, 242/67.4, 75, 75.47; 360/73, 71; 74/665 GA, 665 A, 660

[56] References Cited

U.S. PATENT DOCUMENTS

| | | | |
|---|---|---|---|
| 4,046,334 | 9/1977 | Kato et al. | 242/201 |
| 4,133,498 | 1/1979 | Laufer | 242/201 |
| 4,139,167 | 2/1979 | Osanai | 242/189 |
| 4,196,874 | 4/1980 | Ohara | 242/201 |

*Primary Examiner*—Leonard D. Christian
*Attorney, Agent, or Firm*—DeLio & Libert

[57] ABSTRACT

A tape tensioning system for a tape recorder comprising a train of intermeshed gears supported by an elastically biased moving support which cooperates with support for the magnetic head and pinch roller support so as to move from a retracted inoperative position to an advanced operative position, wherein two outer gears of a train of gears are meshed with one of the reel driving toothed members in order to rotate the outer gears of the train in opposite directions to effect a tension in the associated tape being transported between the supply and take-up reels.

6 Claims, 10 Drawing Figures

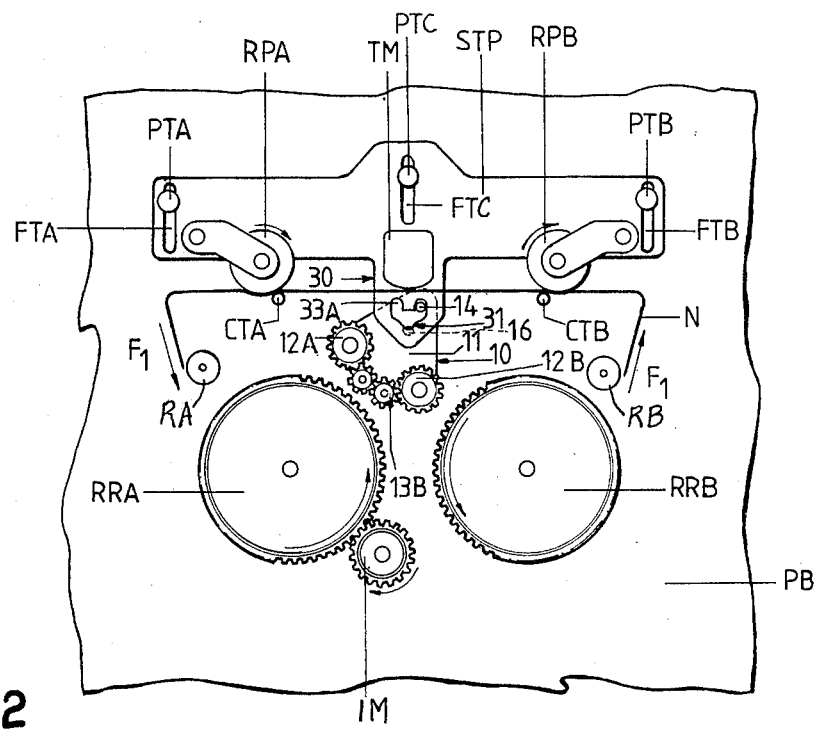
Fig 2
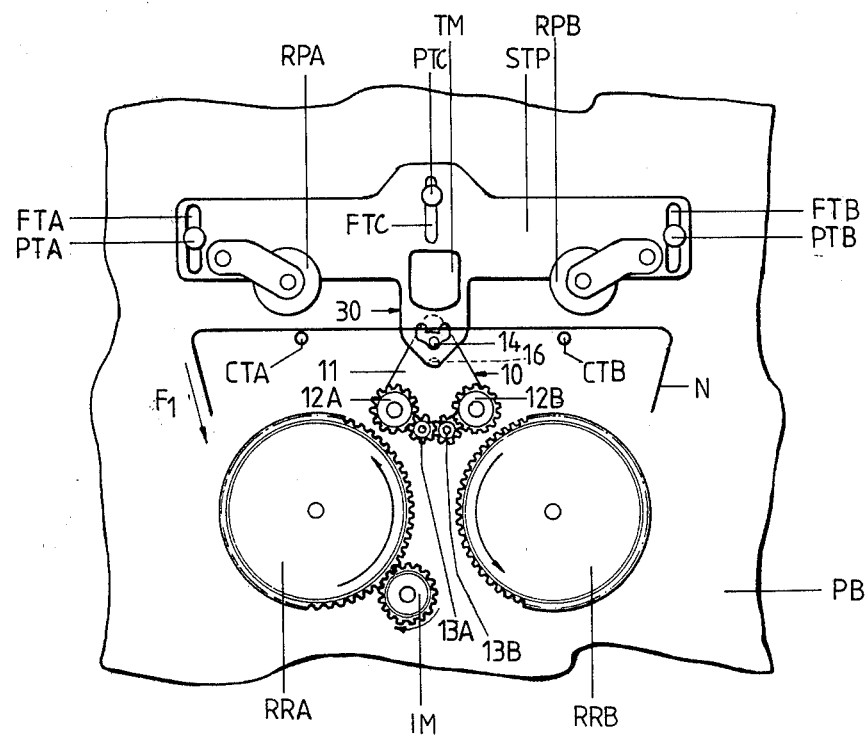

TAPE TENSIONING DEVICE FOR TAPE RECORDERS OF THE CASSETTE TYPE

This invention refers to a tape tensioning device for tape recorders of the cassette type.

Those skilled in the art and interested in the field of cassette tape recorders know that in handling the cassettes, independently of their quality, it is impossible to prevent one or both reels from slightly rotating thus causing the tape length comprised therebetween, which is the tape length engaging the unit comprising the capstan and the pinch roller, to become slack.

This is a drawback in that this slack tape length causes what is technically called "tangling", that is the tape inextricably tangles about the unit comprising the capstan and the pinch roller thus causing the tape recorder to be temporarily out of order and the cassette to be inevitably lost.

This drawback, which is annoying in tape recorders for domestic use, becomes unbearable in cassette tape recorders associated to car radio sets since the cassette is normally drawn into these recorders and it is impossible to disentangle the tape from the transport unit without disassembling the whole radio set.

At present, only the most sophisticated and costly cassette tape recorders are provided with an electronic lagging device which upon introduction of the cassette operates the driving members of the reels in the opposite direction and for a preset time so as to tighten up the tape length involved.

Besides being rather costly, this solution is unsatisfactory since it may happen that the slack tape length is of such a length that the preset time is insufficient to rewind all the tape length unwound from the reel and, accordingly, the drawback is not completely overcome.

Accordingly, it is an aim of the invention to provide a mechanical device for automatically rewinding the tape on the cassette reels upon introduction of each cassette into the tape recorder, which device stops its operation only when the slack tape length has been completely rewound and tightened up.

It is a further object of the invention to provide such a device which is not costly and is of reliable operation.

The device of the invention comprises a train of gears including an even number of gears, which train of gears is carried out by a support moving from an operative position, wherein the two outer gears of the train of gears are meshed with both tape recorder driving members transmitting the rotating movement to the cassette reels on which the tape is wound and wherein the moving support prevents the support of the magnetic head (or heads) and the pinch roller (or rollers) from moving into the operative position, to an inoperative position wherein the train of gears is not meshed with any of the driving members of the cassette reels and the moving support allows the support of the magnetic head and the pinch roller to move into the operative position.

It should be noted that the above-mentioned moving support can take three different positions according to the position of the magnetic head or heads and the pinch roller or rollers of the tape recorder with which this moving support cooperates. For practical purposes, however, it is sufficient to say that the moving support normally moves into the operative position upon introduction of the cassette into the tape recorder and it remains therein until the tape length of the cassette introduced has been tightened up. The moving support then moves automatically into an inoperative position, of which are two in tape recorders provided with reverse operation, as will be described later, as soon as the tape length comprised between the reels has been tightened up and the support remains therein until the operation of the tape recorder is changed, as will be described later.

The tape tensioning device of the invention will be now described in more detail with reference to the annexed drawings, wherein:

FIG. 1 is a top view of the device of the invention in the position in which the cassette is not introduced;

FIG. 2 is a similar view of the device in one of the operative positions with the cassette introduced;

As clearly seen in FIGS. 1-4, the device of the invention comprises an independent portion generally indicated by reference number 10 and a portion 30 forming a projection of the support of the magnetic head and the pinch roller or rollers, which support is a part of the tape recorder on which the device is installed and it is adapted to move in parallel relationship on bottom plate PB of the recorder frame.

Independent portion 10 substantially comprises the above-mentioned moving support, indicated by 11, and the train of gears supported thereby, which train of gears comprises an even number of gears and it is here exemplified by four meshed gears indicated by reference numbers 12A, 13A, 13B, 12B, respectively, each gear being adapted to freely rotate about its axis.

Figure 7:
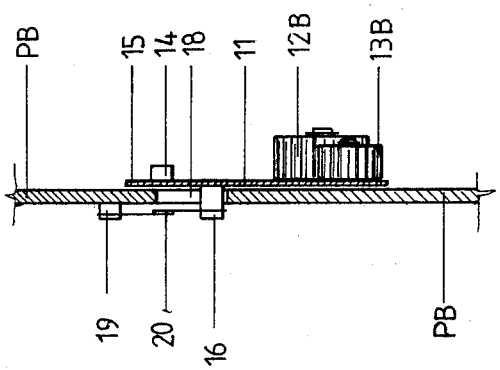
FIG. 7 is a vertical sectional view taken along line VII—VII of FIG. 6, showing the moving support.
Figure 6:
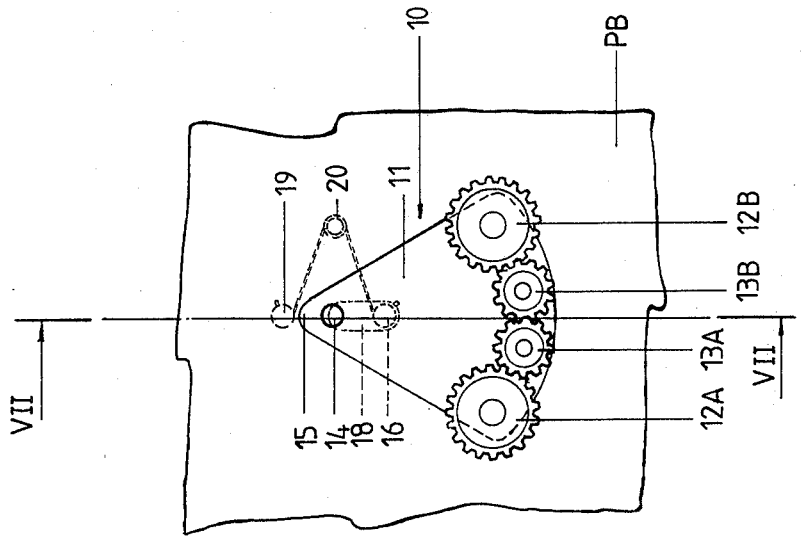
FIG. 6 is an enlarged top view showing the moving support of the device.

Moving support 11 substantially has the shape of a sector of circle and it comprises a pin 14 upwardly protruding from the upper face thereof, pin 14 being placed close to end 15 of moving support 11, and a grooved pivot 16 downwardly protruding from the underside thereof through a suitable elongated slot 18 in bottom plate PB (FIGS. 6 and 7).

A grooved pin 19 protrudes from the underside of bottom plate PB in alignment with slot 18. A bistable or snap-over spring 20 acts between pivot 16 and pin 19, the ends of spring 20 being received within the respective grooves thereof.

Figure 4:
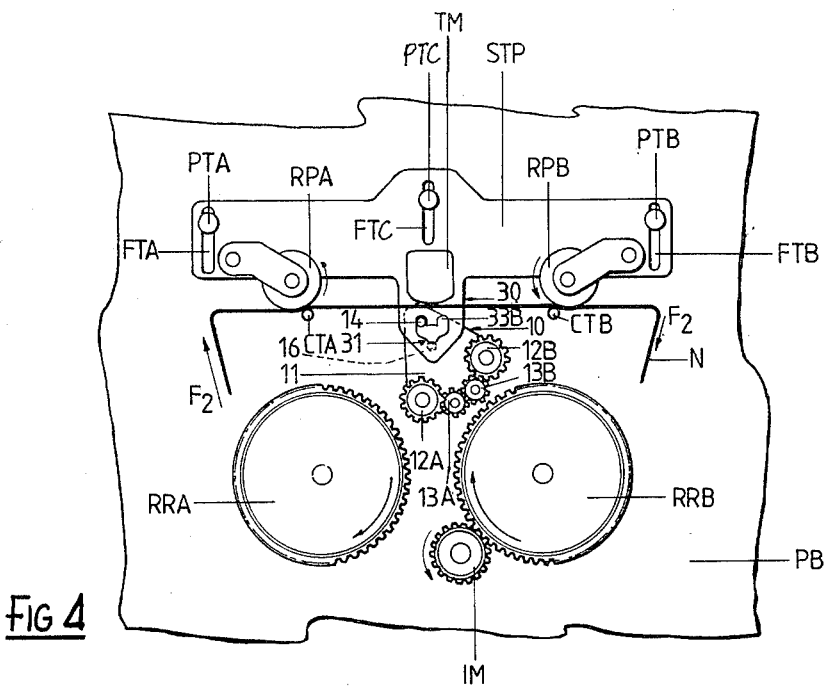
FIG. 4 is a similar view of the device in the second operative position with the cassette introduced.

Spring 20 biasses support 11 into the advanced positions shown in FIGS. 2 and 4.

Projection 30 is integrally formed with support STP of magnetic head TM and the pinch roller (two pinch rollers RPA and RPB being shown in the figures since a tape recorder provided with reverse operation and comprising two capstans CTA and CTB is illustrated therein). Projection 30 is placed above support 11 and it comprises a generally V-shaped or heart-shaped (hereafter referred to as "V-shaped") opening 31 including a semicircular notch 32 at the apex of the V and two like notches indicated by 33A and 33B at the end of each arm thereof. Furthermore, the transversal portion between the two end notches 33A and 33B (FIG. 8) is also slightly arcuated thus forming a notch 34.

Figure 3:
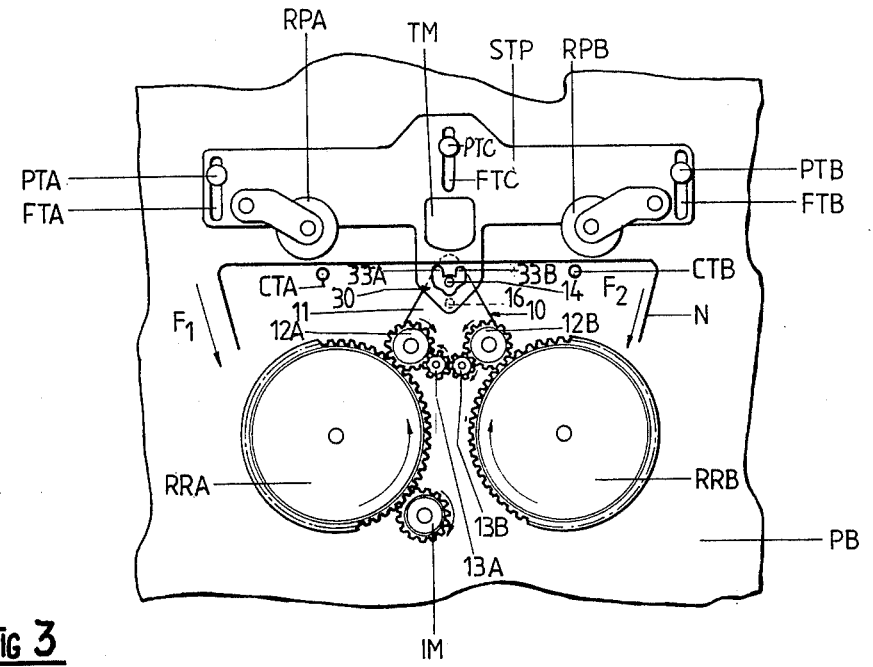
FIG. 3 is a similar view of the device in the inoperative position following the operative position of FIG. 2, with the cassette introduced.
Figure 5:
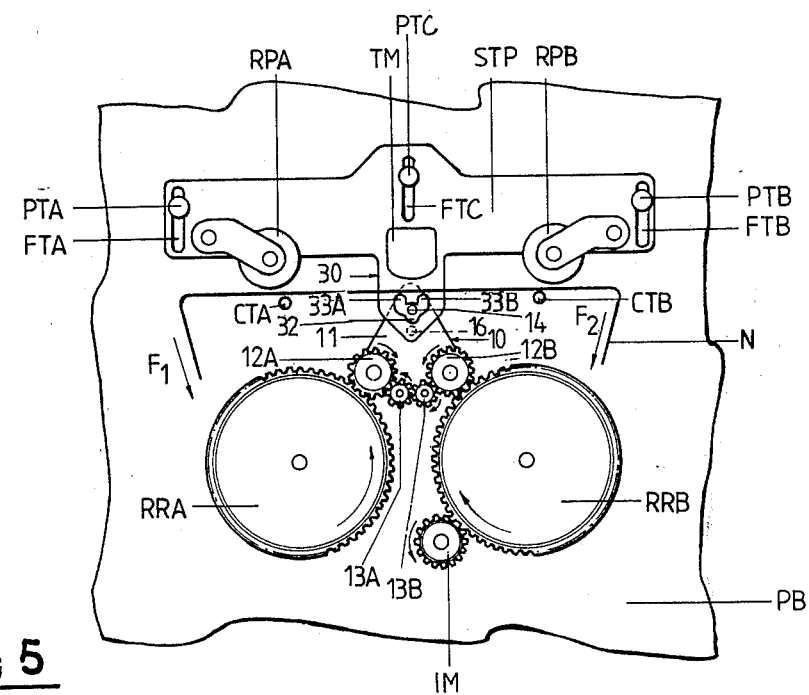
FIG. 5 is a similar view of the device in the inoperative position following the operative position of FIG. 4, with the cassette introduced.

The device is so assembled that upper pin 14 of support 11 is placed within opening 31 in projection 30 of magnetic head and pinch roller support STP, which projection 30 overlies support 11. Furthermore, as it usually happens in tape recorders of this type, upon operating a suitable driving means, magnetic head and pinch roller support STP can move on bottom plate PB from a retracted inoperative position, wherein pinch rollers RPA, RPB are spaced from corresponding capstans CTA, CTB and magnetic head TM is out of the path of tape N (FIG. 1), to an advanced operative position wherein the pinch rollers grip tape N against the corresponding capstans and magnetic head TM engages tape N (FIGS. 3 and 5).

The tape N, extends in a conventional manner between reels RA, RB indicated diagrammatically in FIG. 2, adjacent to the toothed member on which, in operation, the reels are mounted.

The driving means for support STP is already known and accordingly it will not be further described and illustrated. It will be sufficient to say that this driving means is adapted to move support STP into the retracted position of FIG. 1 upon ejection of the cassette, holding support STP in this position while there is no cassette in the tape recorder, and to bias support STP into the advanced operative position upon introduction of a cassette into the tape recorder, this bias continuing until the cassette will be ejected.

The different figures show only the means holding magnetic head and pinch roller support STP on bottom plate PB yet allowing the above-mentioned movement thereof. This means comprises transversal slots FTA, FTB, FTC of support STP and headed pins PTA, PTB, PTC integrally formed with bottom plate PB and fitted within slots FTA, FTB, FTC.

The train of gears supported by moving support 11 is intended to cooperate with gears RRA, RRB driving the cassette reels (not shown).

As it is known, in cassette tape recorders it is always the gear of the reel upon which the tape is being wound which is rotated. Accordingly, in cassette tape recorders provided with reverse operation either one gear or the other is rotated according to the direction of movement of the tape. This is exemplified in the figures by driving gear IM which is shown as mshed either with gear RRA (FIGS. 1, 2 and 3) or with gear RRB (FIGS. 4 and 5).

In the first case tape N will move in the direction of arrow F1 while in the second case tape N will move in the direction of arrow F2, the direction of rotation of the different gears being indicated by the corresponding arrows.

The device thus constructed and arranged operates as follows.

When no cassette is introduced in the tape recorder support STP is in the inoperative position shown in FIG. 1, under the action of the driving means, and accordingly also moving support 11 is pulled into the retracted position by the action of notch 32 on pin 14, against the bias of snap-over spring 20.

Figure 8:
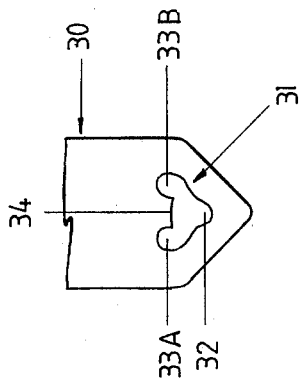
FIG. 8 is an enlarged detailed top view showing the projection of the magnetic head support of the tape recorder cooperating with the moving support of FIGS. 5 and 6.

Besides operating the motor and transmitting the movement thereof to the capstans and either to member RRA (FIG. 2) or to member RRB (FIG. 4), according to the either normal or reverse movement of the tape, the introduction of a cassette into the recorder will also operate the driving means of support STP in such a direction that pinch rollers RPA and RPB will engage capstans CTA and CTB and magnetic head TM will engage tape N. The movement of support STP in this direction, however, will disengage moving support 11 which will thus move in the same direction under the action of spring 20 and stop when outer gears 12A, 12B of the train of gears engages members RRA, RRB, respectively (FIG. 3), also blocking the movement of support STP since portion 34 of opening 31 abuts against pin 14 in this position (FIGS. 2 and 8).

Meanwhile, since the above-mentioned figures show the reverse operation of the tape recorder, driving gear IM which is driven clockwise by the tape recorder motor (not shown) has meshed gear member RRA in a known manner, which gear member RRA will thus rotate counterclockwise as indicated by the arrow.

This counterclockwise rotation of gear member RRA, one of the reels of the cassette introduced into the tape recorder being fitted on the hub thereof in a known manner, will be transmitted to the other gear member RRB through gears 12A, 13A, 13B, 12B forming the train of intermeshed gears supported by moving support 11, the other reel of the cassette being fitted on the hub of bear RRB.

Of course, since the train comprises an even number of gears, gear RRB will be rotated in the opposite direction in respect of gear RRA and, accordingly, it will rotate clockwise.

The opposite rotation of gears RRA and RRB and accordingly of the reels of the cassette introduced into the tape recorder will tension the tape length possibly unwound from either one or the other reel.

However, since this tape length is tensioned on the cassette reels and then on gears RRA, RRB, the tape will exert a dragging force so that the gears will tend to stop. Particularly, gear RRB will stop while gear RRA driven by driving gear IM will continue to rotate and accordingly all the gears forming the train supported by moving support 11 will continue to rotate. In particular, gear 12B will continue to rotate counterclockwise and, since gear RRB is not rotating, gear 12B will move thereon using it as a rack, thus forcing moving support 11 to rotate clockwise about pivot 16 (FIG. 2).

The clockwise rotation of moving support 11 will cause pin 14 to disengage from portion 34 of opening 31 and to move towards notch 33B. Support STP, which is no longer blocked by the engagement of pin 14 with portion 34, can thus move to its operative position under the action of the driving means thereof, while the train of gears will remain in its inoperative position since it is now completely disengaged both from gear RRA and from gear RRB.

This condition is illustrated in FIG. 2, wherein pinch rollers RPA and RPB are shown as gripping the tape now tightened up against the corresponding capstans CTA, CTB. The tape is thus moved into engagement with magnetic head TM thus operating the tape recorder.

It should be noted that moving support 11 will remain in the inoperative position until support STP is moved back, that is the operation of the tape recorder is changed. Particularly, the return of support STP into the retracted position will move moving support 11 into its non-rotated retracted position of FIG. 1 owing to the action of both side 32B and notch 32 of opening 31, which side 32B and notch 32 engage pin 14 during the return movement of support STP, so as to cause moving support 11 to rotate and move back against the bias of spring 20, as it will be readily apparent from FIGS. 1, 3, 6 and 7.

FIGS. 4 and 5 show the same function of the device of the invention, but where the cassette tape recorder operates in the normal direction.

In this case, driving gear IM will engage gear RRB and the whole operation will be performed in the opposite direction, as clearly indicated by the arrows. Gear 12A will move on gear RRA using it as a rack, so that moving support 11 will rotate counterclockwise about pivot 16 moving to the position of FIG. 4.

As it will be understood also in this case support STP can move owing to the space formed by notch 33A which is now engaging pin 14.

Also the return into the inoperative position will occur as described above with side 32A and notch 32 of opening 31 acting on pin 14 in order to cause moving support 11 to rotate and move back into the inoperative position.

Figures 9, 10:
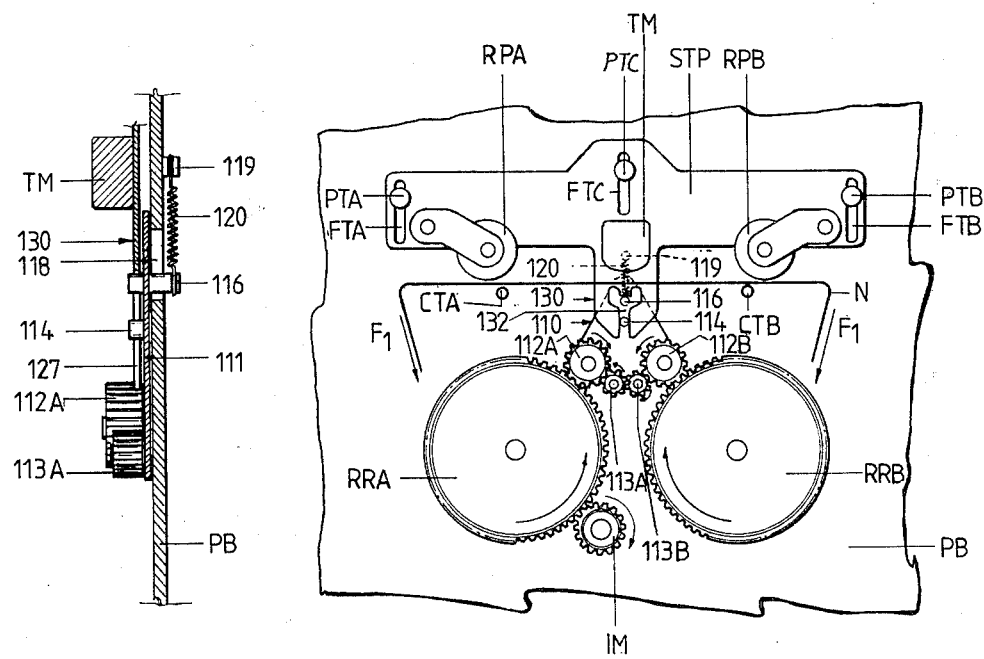
FIG. 9 is a view similar to FIG. 2 showing a second embodimnt of the invention.
FIG. 10 is a view similar to FIG. 7 showing the emodiment of FIG. 9.

FIGS. 9 and 10, wherein the parts identical with or similar to the parts of the first embodiment are indicated by the same reference numbers increased by 100, show another embodiment of the invention very similar to the embodiment described and illustrated above.

In this embodiment, however, the return of moving support 11 into the retracted position is ensured by a traction spring 120 (FIG. 10) acting between pin 119 secured to bottom plate PB and pivot 116 integrally formed with moving support 111. Of course, opening 121 is modified and notch 32 is replaced by slot 132 which is adapted to center pin 114 when moving support 111 must return from either one or the other rotated inoperative position (identical with the positions illustrated in FIGS. 2 and 4 with reference to moving support 11) to the retracted inoperative position. The remaining part of the operation of this second embodiment of the device of the invention is substantially identical with the operation of the first embodiment described and illustrated above and accordingly it will not be described again.

From the foregoing it will be evident that the device of the invention solves completely and efficiently the problem of the slack in the tape length comprised between the two reels of magnetic tape cassettes, thus completely overcoming the drawback of the tape tangling due to this slack.

It will be apparent to those skilled in the art that changes and modifications can be made to the device as described and illustrated above without departing from the concepts and scope of the invention.

I claim:

1. In a cassette tape recorder comprising a frame having a bottom plate, two toothed members journaled on said plate and adapted to receive the tape-bearing reels of a cassette, a reversible drive gear engageable alternatively with each toothed member, a first support mounted on said plate for limited guided movement relative to said plate, a magnetic head and pinch rollers mounted on said first support and spaced capstans projecting from said bottom plate in positions to cooperate with the pinch rollers in engaging a tape, a tape tensioning device comprising an elastically biassed movable second support, a train of an even number of intermeshed gears journaled on said second support, means mounting said second support for limited movement with respect to said first support to an advanced operative position wherein the two outer gears of said train are meshed, respectively, with the two toothed members to cause rotation of the member not engaged by the drive gear in the direction opposite to that of the member engaged by the drive gear, and to an inoperative position when the tape length between the reels has been tightened, the means mounting the second support on the first support comprising matching engagement means adapted to prevent the first support from advancing completely when the second support is in advanced operative position and to permit said first support to advance completely when said second support is in advanced inoperative position but rotated in respect of said advanced operative position.

2. The tape tensioning device according to claim 1, wherein said means mounting said second support on the first support comprises a projection having a V-shaped opening comprising a notch at the apex, a notch at the end of each arm and a slight notch at the portion comprised between said two arms, said opening being placed above said moving second support which is provided with an upwardly directed pin received within said opening and intended to cooperate therewith and with said slight notch to prevent said magnetic head and pinch roller support from advancing completely when said moving support is not rotated in respect of said advanced operative position, said notch at the apex acting on said pin for causing said moving support to move back into said retracted position and the sides of said opening acting on said pin causing said moving support to move back into said non-rotated position.

3. The device according to claim 2, wherein said moving support is elastically biassed towards its retracted position by an expansion spring.

4. The device according to claim 1, wherein said means mounting said second support on the first support comprises a projection having a V-shaped opening comprising a slot at the apex, a notch at the end of each arm and s light notch at the portion comprised between said two arms, said opening being placed above said moving support which is provided with an upwardly directed pin received within said opening and intended to cooperate therewith and with said slight notch in order to prevent said magnetic head and pinch roller support from advancing completely when said moving support is not rotated in respect of said advanced operative position, the sides of said opening acting on said pin in order to cause said moving support to move back into said not-rotated position.

5. The device according to claim 4, wherein said moving support is elastically biassed towards its advanced position by a traction spring.

6. The device according to claim 1, wherein said train of an even number of gears comprises four gears.

* * * * *

UNITED STATES PATENT AND TRADEMARK OFFICE
CERTIFICATE OF CORRECTION

PATENT NO. : 4337910

DATED : July 6, 1982

INVENTOR(S) : Giovanni Santoro

It is certified that error appears in the above-identified patent and that said Letters Patent are hereby corrected as shown below:

Column 1, line 47
  delete "out"

Column 4, line 30
  delete "bear"
  insert --gear--

Signed and Sealed this

Sixteenth Day of November 1982

[SEAL]

Attest:

Attesting Officer

GERALD J MOSSINGHOFF

Commissioner of Patents and Trademarks